United States Patent
Vervaeke et al.

(10) Patent No.: US 9,803,978 B2
(45) Date of Patent: Oct. 31, 2017

(54) LASER ROD SURFACE ELEVATION TABLE DEVICE AND METHOD

(71) Applicant: The United States of America as represented by the Secretary of the Department of the Interior, Washington, DC (US)

(72) Inventors: William C. Vervaeke, Duson, LA (US); Christopher J. Wells, Saline, LA (US); Ryan M. Twilley, Lafayette, LA (US); David P. Turnipseed, Breaux Bridge, LA (US)

( * ) Notice: Subject to any disclaimer, the term of this patent is extended or adjusted under 35 U.S.C. 154(b) by 112 days.

(21) Appl. No.: 15/047,806

(22) Filed: Feb. 19, 2016

(65) Prior Publication Data

US 2016/0245650 A1    Aug. 25, 2016

Related U.S. Application Data

(60) Provisional application No. 62/118,159, filed on Feb. 19, 2015.

(51) Int. Cl.
*G01C 15/06* (2006.01)
*G02B 27/10* (2006.01)
(Continued)

(52) U.S. Cl.
CPC .............. *G01C 15/06* (2013.01); *G01C 1/02* (2013.01); *G01C 11/00* (2013.01); *G01C 15/00* (2013.01);
(Continued)

(58) Field of Classification Search
CPC .. G02B 27/1093; G01C 15/002; G01C 15/06; G01C 15/00; G01C 1/02; G01C 11/00
(Continued)

(56) References Cited

U.S. PATENT DOCUMENTS 3,588,249 A * 6/1971 Studebaker .......... G01C 15/004
172/1
3,591,926 A * 7/1971 Trice, Jr. .................. G01C 5/00
33/1 H (Continued)

OTHER PUBLICATIONS

Cahoon, Donald R., et al., "High-precision measurements of wetland sediment elevation: II. The rod surface elevation table." Journal of Sedimentary Research (2002) 72.5: 734-739.

*Primary Examiner* — R. A. Smith
*Assistant Examiner* — Tania Courson
(74) *Attorney, Agent, or Firm* — Absolute Technology Law Group LLC (57) ABSTRACT

A laser rod surface elevation table (L-RSET) includes a sensor arm coupled to a stepper motor and a screw frame. A screw interconnects the motor and frame, while a screw carriage interconnects the screw and a sensor carriage. A laser sensor is mounted to the sensor carriage. A controller includes at least one processor operatively coupled to the sensor and motor. The processor processes measurement values in a data structure and performs functions to actuate the motor and sensor. The data structure represents a quasi-unique topographical measurement project, and is configured with the measurement values, including a radius value R which defines an area, a start point value X and a stop point value Y for positioning the screw carriage, a speed value S for speed of advancement of the screw carriage, an interval value I for measurement interval, and a points value N for points of measurement per measurement interval.

20 Claims, 4 Drawing Sheets

(51) Int. Cl.
G01C 15/00    (2006.01)
G01C 1/02     (2006.01)
G01C 11/00    (2006.01)
G01F 23/30    (2006.01)
G01F 23/66    (2006.01)

(52) U.S. Cl.
CPC ............ *G01C 15/002* (2013.01); *G01F 23/30* (2013.01); *G01F 23/66* (2013.01); *G02B 27/1093* (2013.01)

(58) Field of Classification Search
USPC .......... 33/227–228, 286, 290–299, 370–373, 33/809–812, DIG. 21; 702/150, 159; 73/312; 356/499

See application file for complete search history.

(56) References Cited

U.S. PATENT DOCUMENTS

| | | | | |
|---|---|---|---|---|
| 5,287,627 | A * | 2/1994 | Rando | G01B 3/00 33/227 |
| 6,452,684 | B1 | 9/2002 | Mennink | |
| 7,155,835 | B2 * | 1/2007 | Hayes | G01C 15/004 33/286 |
| 7,197,425 | B2 | 3/2007 | Masuyama et al. | |
| 7,546,765 | B1 | 6/2009 | Janke et al. | |
| 8,826,553 | B2 * | 9/2014 | Kahle | G01C 15/06 33/290 |
| 8,943,701 | B2 * | 2/2015 | Hayes | G01C 15/002 33/1 G |
| 9,182,229 | B2 * | 11/2015 | Grasser | G01C 15/00 |
| 9,696,197 | B1 * | 7/2017 | Kroes | G01F 23/66 |
| 2012/0066920 | A1 * | 3/2012 | Stangl | G01C 9/08 33/366.11 |
| 2014/0202013 | A1 * | 7/2014 | Smith | G01C 5/00 33/286 |
| 2015/0268045 | A1 * | 9/2015 | Dusha | G01C 15/06 33/228 |
| 2016/0377431 | A1 * | 12/2016 | Kahlow | G01C 15/06 33/228 |

* cited by examiner

LASER ROD SURFACE ELEVATION TABLE DEVICE AND METHOD

CROSS-REFERENCE TO RELATED APPLICATIONS

This patent application claims the benefit of U.S. Provisional Application No. 62/118,159 filed Feb. 19, 2015. The above application is incorporated by reference herein.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

BACKGROUND OF THE INVENTION

1. Field of Invention

This invention relates to the field of data processing of measurements and more specifically to a topographical measurement system.

2. Description of Related Art

Each year federal and state governments conduct thousands of environmental, hydrological and meteorological research studies which require highly accurate data about soil elevation changes. Soil elevation data sets must be gathered on site (in situ) at critical locations over timed intervals. The international scientific community relies on accurate soil elevation data sets to predict and model changes in sea level, climatological events, marsh erosion and the health of estuary ecosystems. Despite the clear scientific need and economic value of building repositories of highly accurate soil elevation data sets over time, there is limited technology for doing so.

The Rod Surface Elevation Table (RSET) tool is the technology currently used for in situ procurement of soil elevation data in 25 countries and 25 US states. The RSET allows scientists to obtain multiple contemporaneous soil elevation measurements along a defined linear path at a research site. Using the RSET, researchers vertically place rods or pins along the linear path by sliding them through apertures in a linear guide called a "measuring arm." One end of each rod or pin contacts the soil surface. The portion of each rod or pin that remains above the aperture on the measuring arm will then vary over time due to changes in soil elevation.

The measuring arm is attached to a stationary object called a "benchmark." The benchmark maintains the position of the measuring arm at a constant elevation, irrespective of any changes in the surface elevation. Each rod or pin represents a measurement point. To obtain measurements for each point, a researcher manually measures the portion of the respective rod or pin which remains above the measuring arm.

Despite widespread reliance on the RSET by the scientific community, there are two inherent types of errors associated with measurements obtained using the RSET. These errors, alone and in combination, materially compromise the accuracy of data obtained using the RSET. As a result, researchers typically assume a maximum precision of about 0.5 cm due to variations resulting from manual placement and measurement.

Introduction of a first type of error occurs during manual placement of the rods or pins. An operator may inadvertently push rods or pins below the soil surface. As a result, soil elevation measurements can vary based on the amount of pressure or force applied by a particular individual. Researchers cannot adjust soil elevation data sets based on how deeply particular operators may have embedded the rods or pins in the soil surface.

The second type of error is typically introduced when taking measurements after placement of the rods or pins. An operator must accurately measure a distance on the rod or pin to extrapolate soil elevation for each sample point. Errors result when operators utilize different measuring tools or when a single operator is not consistent in measuring and recording. One operator may not be able to duplicate another operator's method of making measurements, resulting in inconsistent data if an original operator is replaced.

Additionally, the RSET yields only limited amounts of data for a given point in time. Scientific research is often restricted or delayed by the slow rate of data acquisition. Studies can be delayed for two or more years due to waits for RSET data.

There is an unmet need for an in situ soil elevation data gathering tool that can produce a large number of soil elevation data sets over a shorter period of time.

There is a further unmet need for an in situ soil elevation data gathering tool that can reliably produce highly accurate and precise soil elevation data sets.

There is a further unmet need for an in situ soil elevation data gathering tool that can collect large scale soil elevation data sets currently unavailable to researchers due to limitations of the RSET tool.

BRIEF SUMMARY OF THE INVENTION

One embodiment of the present invention is a laser rod surface elevation table (L-RSET) device. In this device, a pivot mount is operatively coupled to a benchmark rod and a sensor arm. The sensor arm is operatively coupled to a stepper motor and a screw frame. A screw interconnects the stepper motor and the screw frame, while a screw carriage interconnects the screw and a sensor carriage. A laser sensor is mounted to the sensor carriage. A controller includes at least one processor operatively coupled to the laser sensor and the stepper motor. The processor is configured to process a plurality of measurement values in a data structure and to perform functions to actuate the stepper motor and the laser sensor. The one data structure represents a quasi-unique topographical measurement project, and is configured with the measurement values. The measurement values include a radius value R which defines an area, a start point value X and a stop point value Y within the area for positioning the screw carriage along the radius, a speed value S for speed of advancement of the screw carriage, an interval value I for measurement interval, and a points value N for points of measurement per measurement interval.

Another embodiment of the present invention is a method of using an L-RSET device as discussed above. First, the method instantiates at least one settings data structure representing a quasi-unique topographical measurement project. The method then receives one of the measurement values for a radius value R which defines an area. Next, the method receives one of the measurement values for a start point value X within the area for positioning a screw carriage along the radius. The method then receives one of the measurement values for a stop point value Y within the area for positioning the screw carriage along the radius.

Next, the method receives one of the measurement values for a speed value S for speed of advancement of the screw carriage. The method then receives one of the measurement values for an interval value I for measurement interval. Next, the method receives one of the measurement values for a points value N for points of measurement per measurement interval. The method then actuates the stepper motor to rotate a screw located within a screw frame and position the screw carriage at a starting point having a value equal to the start point value X. Next, the method actuates the stepper motor q times to advance the screw carriage along a screw. The value q is the number of intervals calculated using the formula q=(Y-X)/I. The method then actuates a laser sensor N times at each interval.

TERMS OF ART

As used herein, the term "configured to" means configured with a software program to perform a function.

As used herein, the term "data structure" means a collection of data organized using a specific schema.

As used herein, the term "L-RSET" means a laser rod surface elevation table, a device which utilizes a laser to measure the surface of a topographical area of interest.

As used herein, the term "operatively coupled" means connected to in a way that enables functioning.

As used herein, the term "points per interval" means the number of data points obtained at a given point on a radius.

As used herein, the term "RSET" means a rod surface elevation table, a device which utilizes pins to measure the surface of a topographical area of interest.

As used herein, the term "spectroscopic device" means a device utilizing electromagnetic radiation to ascertain the spectral characteristics of objects that interact with the radiation.

As used herein, the term "water penetrating laser" means a laser having a wavelength capable of traveling through water and generating a return pulse.

DETAILED DESCRIPTION OF THE INVENTION

Figure 1:
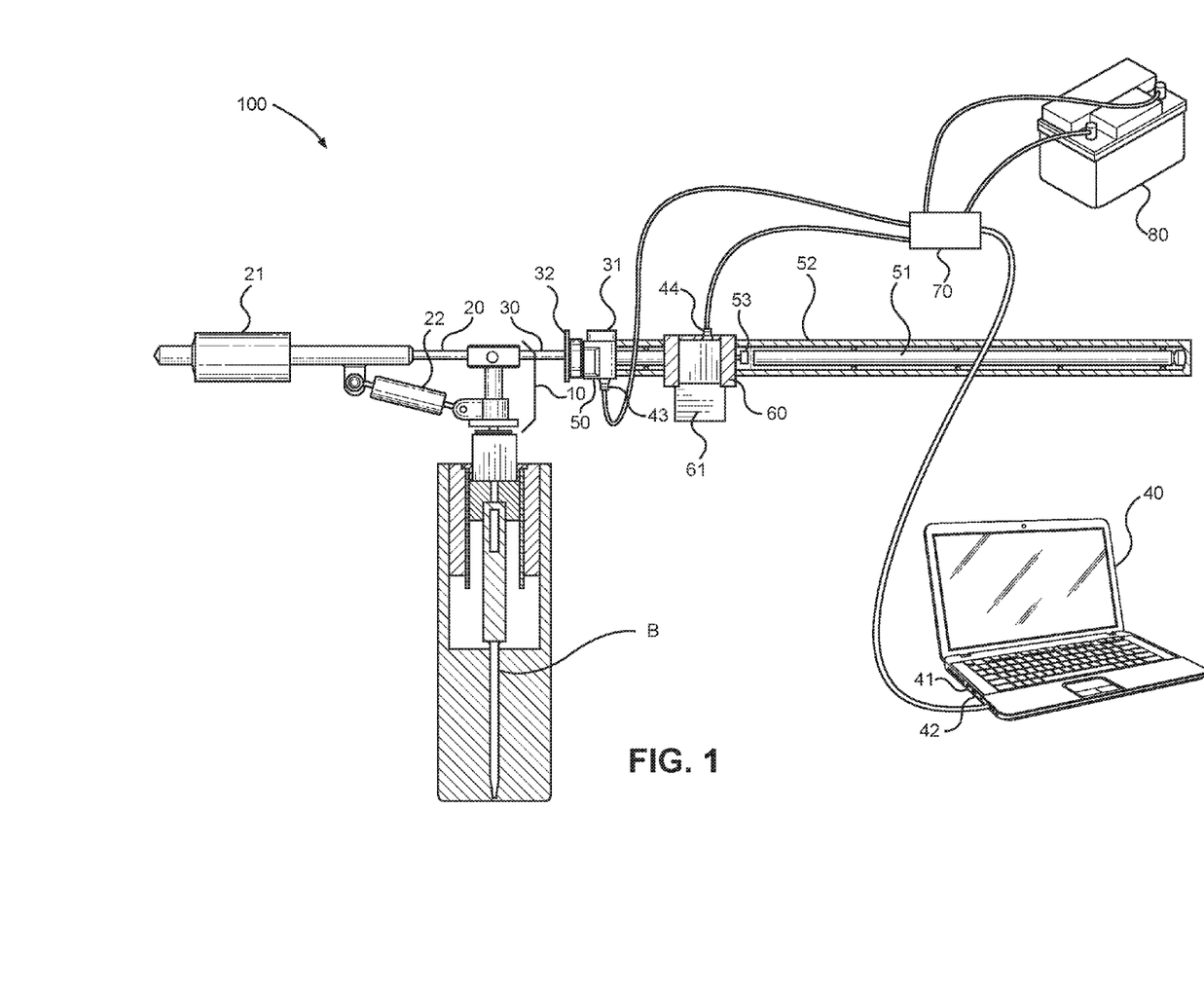
FIG. 1 illustrates an exemplary embodiment of a laser rod surface elevation table (L-RSET).

FIG. 1 illustrates an exemplary embodiment of L-RSET 100. L-RSET 100 is attached to a benchmark rod B using a pivot mount 10. A counterweight 21 attached to a counterweight arm 20 provides balance for a sensor arm 30. Sensor arm 30 is rotated horizontally around benchmark rod B to a position to be analyzed on the plot. In the exemplary embodiment, a user rotates sensor arm 30 manually. In another embodiment, a user rotates sensor arm 30 using a motorized mechanism. L-RSET 100 is leveled vertically to match a target level 31 using a turnbuckle leveler 22. L-RSET 100 is levelled horizontally using a leveler locknut 32 which is threaded onto sensor arm 30.

Cables extend from a separate relay box 70 to a stepper connector 43 on a stepper motor 50. Cables also extend from relay box 70 to a laser connector 44 on a laser sensor 61. Relay box 70 receives power from a power supply 80. Relay box 70 receives data from and transmits data to a controller 40. In the exemplary embodiment, cables allow transmission of data and power. In certain embodiments, only power is transmitted by cables, while data is transmitted wirelessly. In certain embodiments, relay box 70 may include at least one breakout box and at least one stepper motor controller. While power supply 80 is a battery in the exemplary embodiment, other embodiments may use other power supplies 80, such as a mains supply, a generator, a solar cell or any other power supply known in the art.

Parameters for stepper motor 50 and laser sensor 61 are entered in a software program on controller 40. Controller 40 has at least one processor 41 and optional memory storage 42. In the exemplary embodiment, controller 40 is a laptop. During operation, stepper motor 50 rotates a screw 51 within a screw frame 52. A screw carriage 53 encircles screw 51 and attaches to a sensor carriage 60. Rotation of screw 51 advances sensor carriage 60 as screw 51 rotates.

Measurement values such as the interval distance and advancement rate applied by stepper motor 50, and number of reads per interval for laser sensor 61 are under software control from controller 40. After sensor carriage 60 advances an interval distance, laser sensor 61 is triggered to read the distance from the laser sensor 61 to a reflective surface, such as a soil surface, by way of non-limiting example. Laser sensor 61 uses triangulation of a laser pulse to determine the distance from laser sensor 61 to the ground. In the exemplary embodiment, users may determine distance with an accuracy of approximately 0.1 mm. In the exemplary embodiment, laser sensor 61 uses a laser operating at a wavelength between approximately 620 nm and approximately 750 nm. In other embodiments, laser sensor 61 may use a laser operating at a wavelength between approximately 570 nm and approximately 450 nm.

The parameters selected and data acquired are located in a settings data structure and a topographical data structure, respectively. These data structures may be saved to memory storage 42 allow further analysis and repeated use of the same measurement values to ensure consistent measurement.

L-RSET 100 provides greater data precision, reduced measurement variability and increased sample size. Additionally, the sensor carriage 60 on sensor arm 30 allows different instrument packages to be used including water penetrating lasers and spectroscopic devices. These instrument packages cannot be used with traditional devices and methods.

Figure 2A:
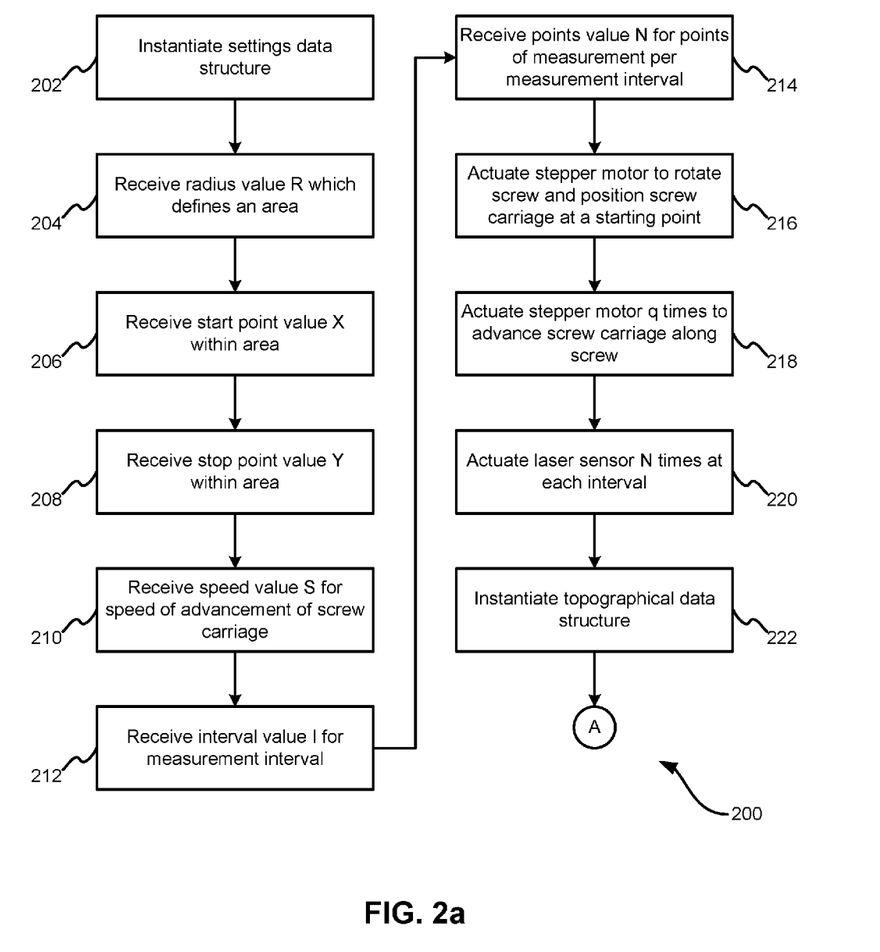
FIGS. 2a-2c are a flowchart of an exemplary method of using the L-RSET.
Figure 2B:
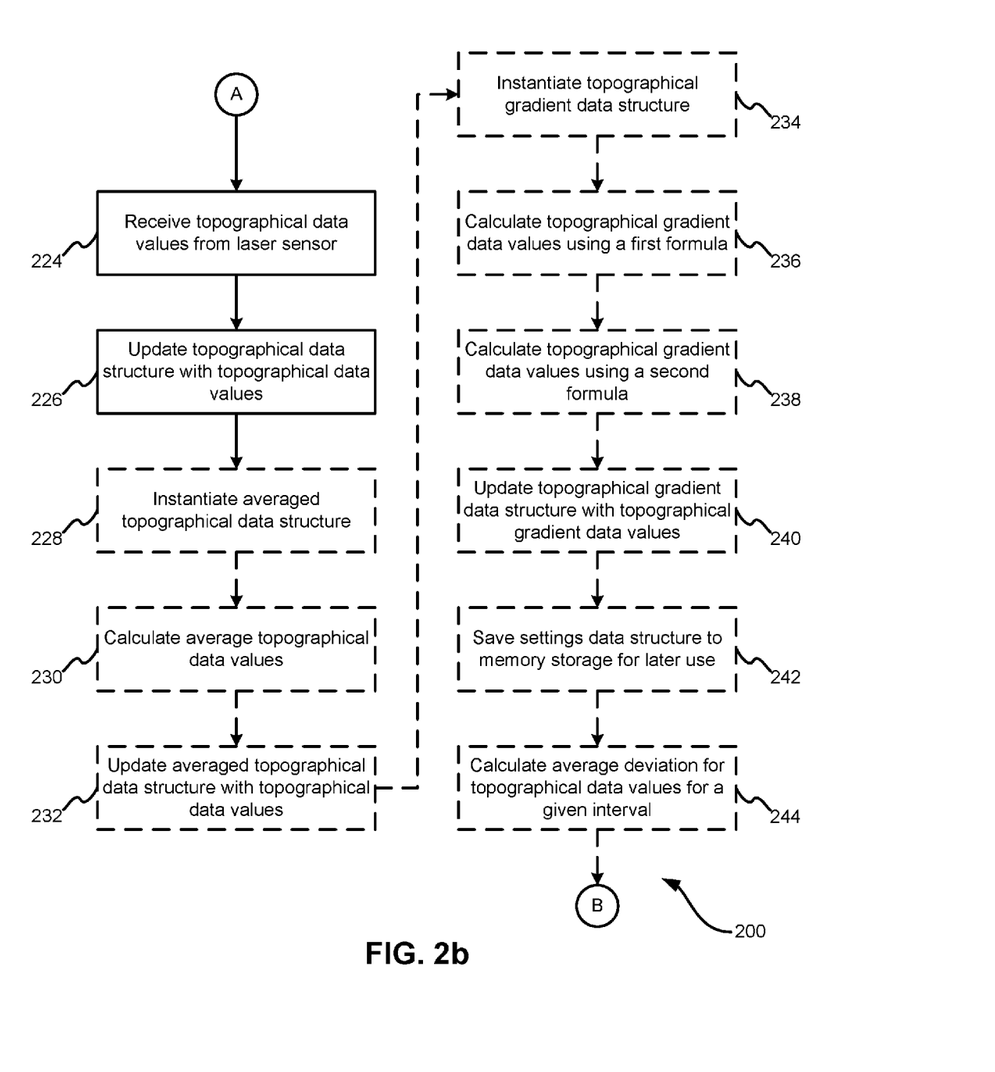
Figure 2C:
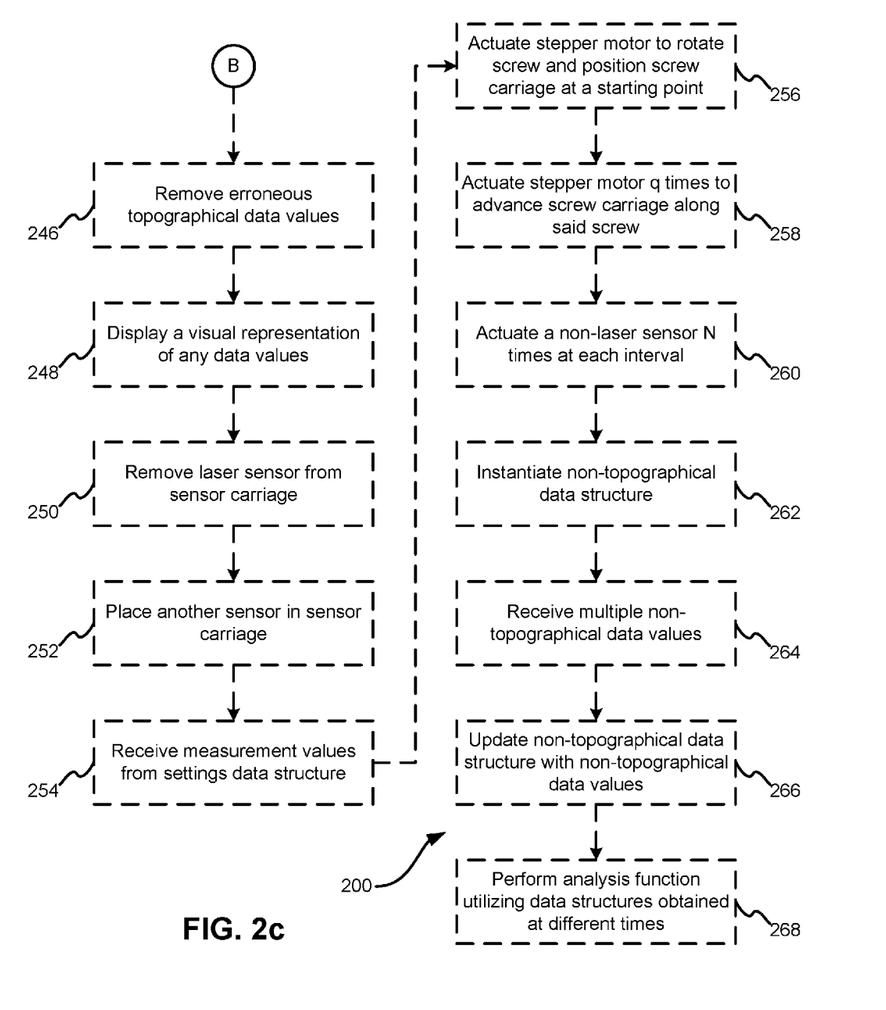

FIGS. 2a-2c are a flowchart of an exemplary method 200 of using L-RSET 100.

In step 202, method 200 instantiates at least one settings data structure representing a quasi-unique topographical measurement project. The settings data structure is configured with a plurality of measurement values.

In step 204, method 200 receives one of the plurality of measurement values: a radius value R which defines an area.

In step 206, method 200 receives another of the plurality of measurement values: a start point value X within the area for positioning screw carriage 53 along the radius.

In step 208, method 200 receives another of the plurality of measurement values: a stop point value Y within the area for positioning screw carriage 53 along the radius.

In step 210, method 200 receives another of the plurality of measurement values: a speed value S for speed of advancement of screw carriage 53.

In step 212, method 200 receives another of the plurality of measurement values: an interval value I for measurement interval.

In step 214, method 200 receives another of the plurality of measurement values: a points value N for points of measurement per measurement interval.

In step 216, method 200 actuates stepper motor 50 to rotate screw 51 located within screw frame 52 and position screw carriage 53 at a starting point having a value equal to the start point value X.

In step 218, method 200 actuates stepper motor 50 q times to advance screw carriage 53 along screw 51. As used herein, q is the number of intervals calculated using the formula $$q = \frac{Y-X}{I}$$

In step 220, method 200 actuates laser sensor 61 N times at each interval.

In step 222, method 200 instantiates at least one topographical data structure.

In step 224, method 200 receives a plurality of topographical data values $T_p$ from laser sensor 61. As used herein, p is the number of topographical data values calculated using the formula $$p = q*N$$

In step 226, method 200 updates the topographical data structure with the topographical data values $T_p$.

In optional step 228, method 200 instantiates at least one averaged topographical data structure.

In optional step 230, method 200 calculates a plurality of average topographical data values $A_q$. Each average topographical value $A_q$ is calculated using the formula $$A_q = \frac{\sum_{i=((q-1)*N)+1}^{i=q*N} T_i}{N}$$

In optional step 232, method 200 updates the averaged topographical data structure with the topographical data values $A_q$.

In optional step 234, method 200 instantiates at least one topographical gradient data structure.

In optional step 236, method 200 calculates a plurality of topographical gradient data values $G_q$. Each topographical gradient data value $G_q$ is calculated using the gradient formula $$G_q = \frac{A_{q+1} - A_q}{I}$$

In optional step 238, method 200 calculates a plurality of topographical gradient data values $G_q$. Each topographical gradient data value $G_q$ is calculated using the gradient formula $$G_q = \frac{A_q - A_{q-1}}{I}$$

In optional step 240, method 200 updates the topographical gradient data structure with the topographical gradient data values $G_q$.

In optional step 242, method 200 saves the settings data structure to memory storage 42 for later use.

In optional step 244, method 200 calculates the average deviation for topographical data values $T_p$ for a given interval.

In optional step 246, method 200 removes erroneous topographical data values $T_e$ using a user-selected filtration algorithm.

In optional step 248, method 200 displays a visual representation of any data values obtained using method 200.

In optional step 250, method 200 removes laser sensor 61 from sensor carriage 60.

In optional step 252, method 200 places another sensor in sensor carriage 60.

In optional step 254, method 200 receives the measurement values from the settings data structure.

In optional step 256, method 200 actuates stepper motor 50 to rotate screw 51 and position screw carriage 53 at a starting point having a value equal to start point value X.

In optional step 258, method 200 actuates stepper motor 50 q times to advance screw carriage 53 along said screw 51.

In optional step 260, method 200 actuates a non-laser sensor N times at each interval.

In optional step 262, method 200 instantiates at least one non-topographical data structure.

In optional step 264, method 200 receives multiple non-topographical data values $F_p$.

In optional step 266, method 200 updates the non-topographical data structure with the non-topographical data values $F_p$.

In optional step 268, method 200 performs at least one analysis function utilizing a first topographical data structure obtained at a first time and at least one other data structure obtained at a second time different from the first time. The other data structure may be a topographical or non-topographical data structure. In certain embodiments, the other data structure is a historical topographical data structure populated by historical topographical data values obtained using an RSET or other device.

In one embodiment, method 200 analyzes historical topographical data values obtained using other devices and compares it to data obtained using L-RSET 100. In another embodiment, method 200 analyzes and compares data values obtained using L-RSET 100 to at one point in time to data values obtained using L-RSET 100 for at least one other point in time. Method 200 may analyze trends in data values between data structures obtained at different times, such as calculating a regression line for data values obtained over time at the same measurement interval. The number of data structures involved in such comparative analysis may be as few as two, or may encompass all data structures ever obtained for a particular plot.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "about," "substantially" or "approximately" as used herein may be applied to modify any quantitative representation that could permissibly vary without resulting in a change in the basic function to which it is related.

What is claimed is:

1. A laser rod surface elevation table (L-RSET) device, comprising:
    a pivot mount operatively coupled to a benchmark rod and a sensor arm;
    said sensor arm operatively coupled to a stepper motor and a screw frame;
    a screw interconnecting said stepper motor and said screw frame;
    a screw carriage interconnecting said screw and a sensor carriage;
    a laser sensor mounted to said sensor carriage;
    a controller comprising at least one processor, wherein said at least one processor is operatively coupled to said laser sensor and said stepper motor, wherein said at least one processor is configured to process a plurality of measurement values in a data structure and to perform functions to actuate said stepper motor and said laser sensor;
    said at least one data structure representing a quasi-unique topographical measurement project, wherein said data structure is configured with said plurality of measurement values, said plurality of measurement values comprising:
        a radius value R which defines an area,
        a start point value X and a stop point value Y within said area for positioning said screw carriage along said radius,
        a speed value S for speed of advancement of said screw carriage,
        an interval value I for measurement interval, and
        a points value N for points of measurement per measurement interval.

2. The device of claim 1, further comprising a replacement sensor package, wherein said laser sensor is removable and replaceable by said replacement sensor package.

3. The device of claim 2, wherein said replacement sensor package is selected from the group consisting of: water penetrating laser and spectroscopic devices.

4. The device of claim 1, further comprising a relay box operatively connecting a power supply, said controller, said stepper motor and said laser sensor, said relay box having a wired power connection between said relay box and said power supply and a data connection between said relay box and said controller.

5. The device of claim 4, further comprising a wired power connection between said relay box and said stepper motor, and a data connection between said relay box and said stepper motor.

6. The device of claim 4, further comprising a wired power connection between said relay box and said laser sensor, and a data connection between said relay box and said laser sensor.

7. A method of using an L-RSET device, comprising:
    instantiating at least one settings data structure representing a quasi-unique topographical measurement project, wherein said settings data structure is configured with a plurality of measurement values;
    receiving one of said plurality of measurement values for a radius value R which defines an area;
    receiving one of said plurality of measurement values for a start point value X within said area for positioning a screw carriage along said radius;
    receiving one of said plurality of measurement values for a stop point value Y within said area for positioning said screw carriage along said radius;
    receiving one of said plurality of measurement values for a speed value S for speed of advancement of said screw carriage;
    receiving one of said plurality of measurement values for an interval value I for measurement interval;
    receiving one of said plurality of measurement values for a points value N for points of measurement per measurement interval;
    actuating said stepper motor to rotate a screw located within a screw frame and position said screw carriage at a starting point having a value equal to said start point value X;
    actuating said stepper motor q times to advance said screw carriage along a screw, wherein q is the number of intervals calculated using the formula $$q = \frac{Y - X}{I}$$

actuating a laser sensor N times at each interval, wherein said laser sensor is operatively coupled to said screw carriage by means of a sensor carriage.

8. The method of claim 7, further comprising the step of saving said at least one settings data structure to a memory storage.

9. The method of claim 8, further comprising the step of performing at least one analysis function utilizing a first topographical data structure obtained at a first time and at least one other topographical data structure obtained at a second time, wherein said second time is different from said first time.

10. The method of claim 7, further comprising the steps of:
    instantiating at least one topographical data structure;
    receiving a plurality of topographical data values $T_p$, wherein p is the number of topographical data values calculated using the formula $$p = q*N$$

updating said at least one topographical data structure with said plurality of topographical data values $T_p$.

11. The method of claim 10, further comprising the steps of:
    instantiating at least one averaged topographical data structure;
    calculating a plurality of average topographical data values $A_q$, wherein each of said plurality of average topographical data values $A_q$ is calculated using the formula $$A_q = \frac{\sum_{i=((q-1)*N)+1}^{i=q*N} T_i}{N}$$

updating said at least one averaged topographical data structure with said plurality of topographical data values $A_q$.

12. The method of claim 10, further comprising the step of calculating average deviation for said plurality of topographical data values $T_p$ for a given interval.

13. The method of claim 10, further comprising the step of filtering any erroneous topographical data values $T_e$ from said plurality of topographical data values $T_p$.

14. The method of claim 11, further comprising the steps of:
- instantiating at least one topographical gradient data structure;
- calculating a plurality of topographical gradient data values $G_q$, wherein each of said plurality of topographical gradient data values $G_q$ is calculated using a gradient formula; and
- updating said at least one topographical gradient data structure with said plurality of topographical gradient data values $G_q$.

15. The method of claim 11, further comprising the step of displaying a visual representation of said topographical data values or said average topographical data values.

16. The method of claim 14, wherein said gradient formula is:

$$G_q = \frac{A_{q+1} - A_q}{I}.$$

17. The method of claim 14, wherein said gradient formula is:

$$G_q = \frac{A_q - A_{q-1}}{I}.$$

18. The method of claim 7, further comprising the steps of:
- removing said laser sensor from said sensor carriage;
- placing another sensor in said sensor carriage;
- receiving said plurality of measurement values from said settings data structure;
- actuating said stepper motor to rotate said screw and position said screw carriage at a starting point having a value equal to said start point value X;
- actuating said stepper motor q times to advance said screw carriage along said screw; and
- actuating a non-laser sensor N times at each interval.

19. The method of claim 18, further comprising the steps of:
- instantiating at least one non-topographical data structure;
- receiving a plurality of non-topographical data values $F_p$;
- updating said at least one non-topographical data structure with said plurality of non-topographical data values $F_p$.

20. The method of claim 19, further comprising the step of performing at least one analysis function utilizing said plurality of topographical data values $T_p$ and said plurality of non-topographical data values $F_p$.

\* \* \* \* \*